United States Patent [19]

Nubani et al.

[11] 4,165,227

[45] Aug. 21, 1979

[54] STEM-SEALING METHOD FOR ASSEMBLING ELECTRON TUBES INCLUDING IMPROVED CULLET COLLECTION

[75] Inventors: Jawdat I. Nubani, Clarks Summit; Raymond L. Muenkel, Plains, both of Pa.

[73] Assignee: RCA Corporation, New York, N.Y.

[21] Appl. No.: 886,827

[22] Filed: Mar. 15, 1978

[51] Int. Cl.[2] .............................................. C03C 27/00

[52] U.S. Cl. .......................................... 65/56; 65/42; 65/59 A; 65/113

[58] Field of Search ................ 65/42, 43, 59 R, 59 A, 65/79, 105, 113, 56

[56] References Cited

U.S. PATENT DOCUMENTS

| | | | |
|---|---|---|---|
| 2,391,573 | 12/1945 | Herzog | 65/43 X |
| 2,886,336 | 5/1959 | Reynard | 279/118 |
| 3,034,778 | 5/1962 | Shaffer et al. | 269/142 |
| 3,807,006 | 4/1974 | Segro et al. | 29/25.13 |

*Primary Examiner*—Arthur D. Kellogg

*Attorney, Agent, or Firm*—E. M. Whitacre; G. H. Bruestle; L. Greenspan

[57] ABSTRACT

In a method for sealing a glass stem into the neck of an electron tube, the stem, which is supported on a mount pin, is positioned in the neck, which is longer than desired. The neck is then heat sealed, as by fusion, to the stem, and the excess glass or cullet is cut off, whereby the cullet falls on, around and sticks to the mount pin. The novel method includes releasing the cullet from the mount pin without substantially fracturing the cullet. Then, the released cullet is removed from the vicinity of the mount pin, again without substantially fracturing the cullet.

7 Claims, 10 Drawing Figures

STEM-SEALING METHOD FOR ASSEMBLING ELECTRON TUBES INCLUDING IMPROVED CULLET COLLECTION

BACKGROUND OF THE INVENTION

This invention relates to a novel stem-sealing method for use in assembling electron tubes including an improved method for removing the excess glass or cullet from the sealing machine.

Stem sealing is a widely-used process in which a glass stem is sealed into the glass neck of an electron tube. The stem is a wafer-shaped piece of glass with the exhaust tubulation extending from one side, the stem leads sealed into and extending therethrough, and the electron gun mounted on the stem leads on the other side. Stem sealing is usually conducted on an automated machine comprising a rotatable turret having a plurality of rotatable supporting means, each including a mount pin for supporting a stem and an envelope holder for supporting an envelope in controlled positions with respect to one another. The envelope and stem are loaded onto the supporting means at a loading station. Then, the turret rotates intermittently from one station to the next until the stem is heat sealed into the neck and the confronting glass, which has been melted to make the seal, is solidified and annealed.

Prior to sealing, the neck, which usually is tubular, is much longer than necessary. During the sealing operation, when the glass is molten, the excess glass is cut off with a sharp flame, and the molten edge solidifies and sticks to and around the mount pin. The operator, upon unloading the sealed envelope, smashes the excess glass or cullet from the mount pin, permitting the fragments to fall in and around a bin adjacent the unloading station. The practice of smashing the cullet is undesirable because it results in poor housekeeping around the sealing machine. Also, the glass fragments may cause injuries to nearby personnel. In addition, the practice of smashing the cullet generates very fine glass particles which become airborne and drift through the factory settling randomly on work surfaces and surfaces of the product. For example, where the factory is making aperture-mask-type color picture tubes, glass particles frequently settle on in-process aperture masks. When these masks are assembled into tubes, the presence of these glass particles may cause the finished tubes to be defective.

SUMMARY OF THE INVENTION

The novel method follows the prior procedure described above except that, after the cullet is cut off, the cullet is released from the mount pin without substantially fracturing it. Then, the cullet is removed from the vicinity of the mount pin again without fracturing the cullet.

One method for releasing the cullet from the mount pin is to rotate the mount pin and cullet and simultaneously apply heat to the cullet to expand it away from the mount pin. Preferably, a platform is positioned under and close to the cullet so that, when the cullet is released, it is supported on the platform. With the platform supporting the cullet, the cullet may be raised or the mount pin lowered so that the mount pin is essentially clear of the cullet. The supporting means is moved to the next station, which is equipped with a chute on one side. Means, such as an air jet, on the other side drives the cullet from the platform into the chute without fracturing the cullet, at least until it is in the chute.

By practicing the novel method, all of the cullet is transferred substantially unfractured into the chute and may be collected in a closed system connected thereto. Thus, the housekeeping and safety around the sealing machine are markedly improved. Also, little or no fine glass particles are generated, resulting in fewer rejected finished electron tubes that result from airborne fine particles depositing on product or work surfaces.

DETAILED DESCRIPTION OF THE PREFERRED EMBODIMENT

The novel method may be practiced on commercial automatic stem sealing machines with only minor modifications to the machines. Such machines are described in detail in the patent literature; for example, U.S. Pat. No. 2,886,336 to C. G. Reynard, U.S. Pat. No. 3,034,778 to P. C. Shaffer et al, and U.S. Pat. No. 3,807,006 to J. F. Segro et al. Hence, only a brief description of the machine will be given.

Figure 1:
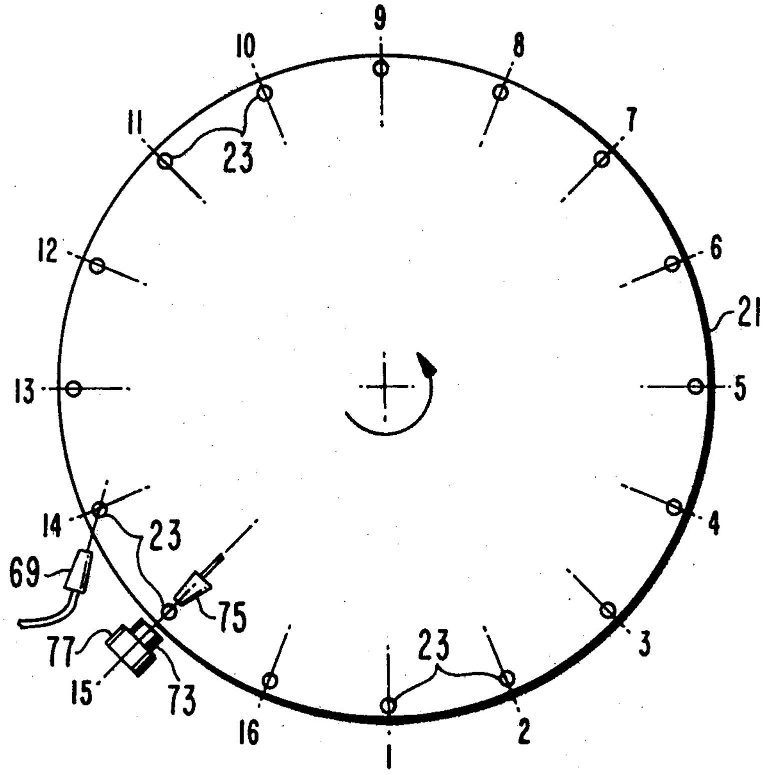
FIG. 1 is a schematic plan view of an automatic 16-station stem sealing machine adapted to practice the novel method.

One form of the machine, shown in FIG. 1, comprises a rotatable turret 21 having 16 rotatable supporting means 23 equally spaced near the edge of the turret 21. Each of the supporting means 23 is located in one of the sixteen numbered stations equally spaced around the turret 21. The turret is adapted to rotate intermittently so that each supporting means 23 advances counter clockwise from station-to-station where the various steps of the sealing process are carried out. Briefly, the stations and their functions are as follows:

Station No. 1—loading the envelope and stem on the supporting means,

Station No. 2—positioning the stem within the neck,

Stations Nos. 3 to 8—preheating the confronting glass portions of the stem and neck where the seal is to be made, Station No. 9—necking in of the neck to the stem, Station No. 10—cutting off the excess neck glass, Station No. 11—completing the sealing of the neck to the stem, Stations Nos. 12 and 13—annealing the seal, Station No. 14—continuing annealing the seal and heating the cullet to expand it away from the mount pin, Station No. 15—continue annealing seal, removing cullet, and cooling mount pin, Station No. 16—cooling mount pin and unloading envelope with sealed-in stem.

Figure 2:
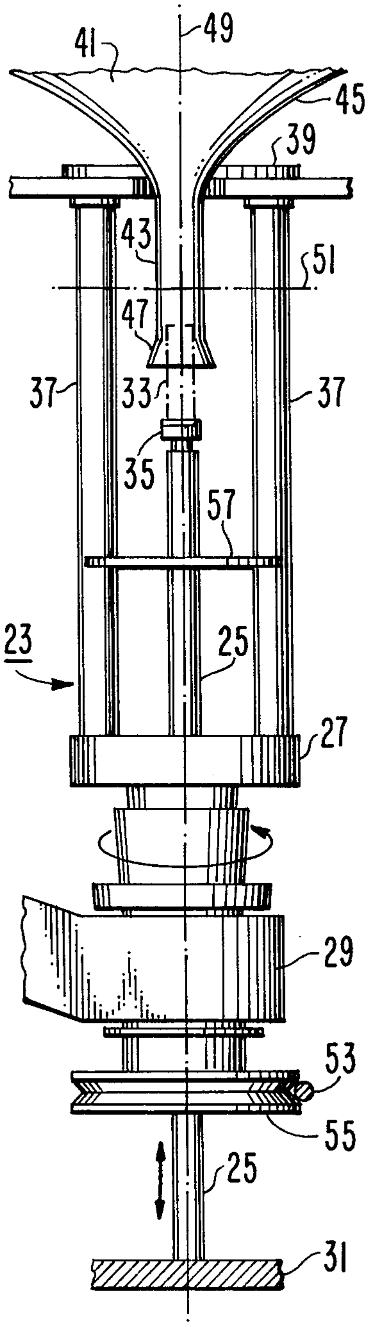
FIG. 2 is a partially-broken elevational view of a supporting means at the loading station No. 1 on the machine shown in FIG. 1 loaded with an envelope and a stem.

FIG. 2 shows a supporting means 23 at the loading station No. 1 comprising a spindle 25 within a rotatable envelope holder 27, which are supported in an arm 29 of the turret 21. The spindle 25 rotates with the envelope holder 27 and also is moved vertically by a stationary rail 31 that contacts its lower end and which extends continuously around the turret 21 at the desired heights. A mount pin 35 of a refractory material is held in the top end of the spindle 25. A mount 33 is positioned in the mount pin 35 by inserting the stem leads and exhaust tubulation thereof in the top end of the mount pin 35 at the loading station. The envelope holder 27 includes two posts 37 which support a collar 39. An envelope 41 which comprises a tubular neck 43 integral with a funnel 45 is positioned on the collar 39 with the neck 43 downward. The neck 43 is longer than required and has a flare 47 at its distal end to simplify the insertion of the mount 33 therein. The envelope 41, supported on the collar 39, is rotated in a prescribed orientation around its longitudinal axis 49 so that a seal is made in the plane of the seal line 51. The envelope holder 27 is rotated by a belt 53 which contacts a pulley wheel 55 attached to the holder 27 below the turret arm 29. A platform 57 is mounted between and to the two posts 37 below the seal line 51. The platform 57 has a central hole therein permitting the mount pin 25 free vertical movement. In an alternative arrangement, the platform 57 is attached to a yoke which extends down and across, engaging the spindle 25 (instead of the posts 37), so that the platform follows the movement of the spindle 25, except at the final lowering of the spindle at station No. 15, when the platform 57 and yoke disengage the spindle 25.

After the envelope 41 and the mount 33 are loaded, the supporting means 23 with the envelope 41 and mount 33 thereon move to station No. 2, where the spindle 25 and mount 33 are moved upwards by the rail 31 to a desired position in the neck. Then, the rotating assembly passes through stations 3 to 8 in which the neck, stem, and mount pin are preheated in preparation for making the seal. Heating is carried out with gas flames that are directed generally horizontally through the rotating posts 37.

Figure 3:
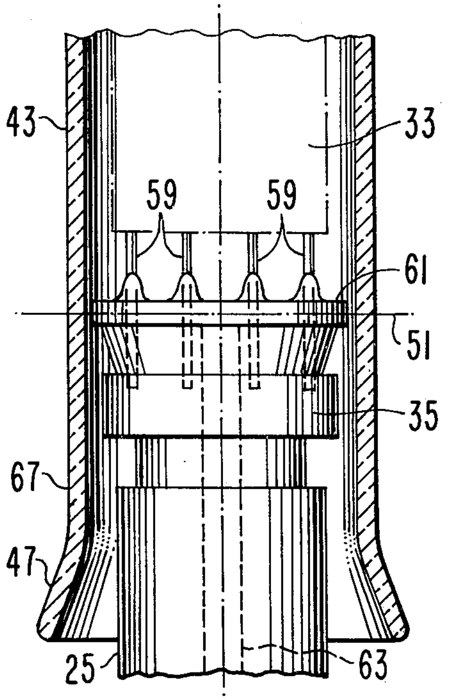
FIG. 3 is an enlarged fragmentary elevational view showing the relative positions of the stem and neck at the necking-in station No. 9 of FIG. 1.
Figure 4:
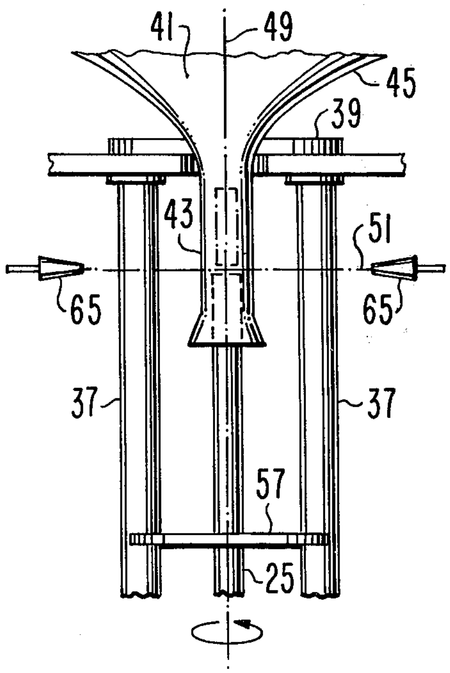
FIG. 4 is a fragmentary elevational view of the supporting means of FIG. 2 at the necking-in station No. 9 of FIG. 1.

At station No. 9, as shown in FIGS. 3 and 4, the mount 33 is supported on stem leads 59 which extend through a glass stem 61 and into the mount pin 35. Also, an exhaust tubulation 63 extends from the stem 61 down inside the mount pin 35 and the spindle 25. The stem 61 is centered on the seal line 51 in the neck 43. At station No. 9, as shown in FIG. 4, the assembly continues to rotate, and sharply pointed fires from nozzles 65 are applied to the neck 43 along the seal line 51. This causes the neck 43 to soften at the seal line 51 and move inward and contact the stem 61. At station No. 10, sharply pointed fires are also applied, causing the excess glass or cullet 67 to be cut off. The molten portion moves inward, attaches to and solidifies on the mount pin 35. At station No. 11, sharply pointed fires are also applied, but only to the neck-to-stem joint where the seal is perfected.

Figure 5:
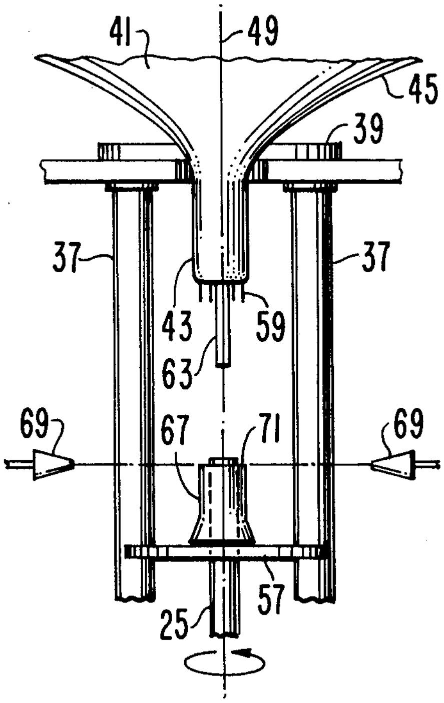
FIG. 5 is a fragmentary elevational view of the supporting means of FIG. 2 advanced to the cullet-releasing station No. 14 of FIG. 1.
Figure 6:
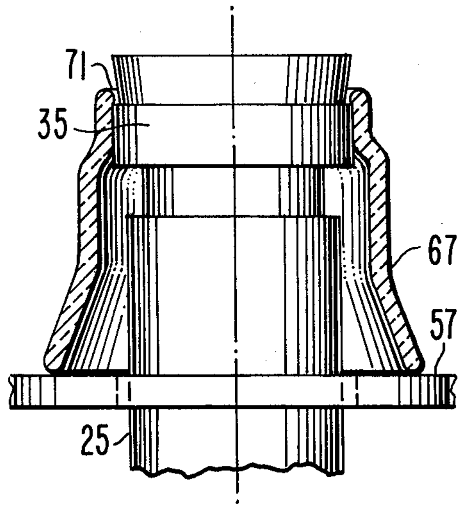
FIGS. 6 and 7 are enlarged fragmentary elevational views of a portion of FIG. 5 before and after the cullet has released from the mount pin at station No. 14 of FIG. 1.
Figure 7:
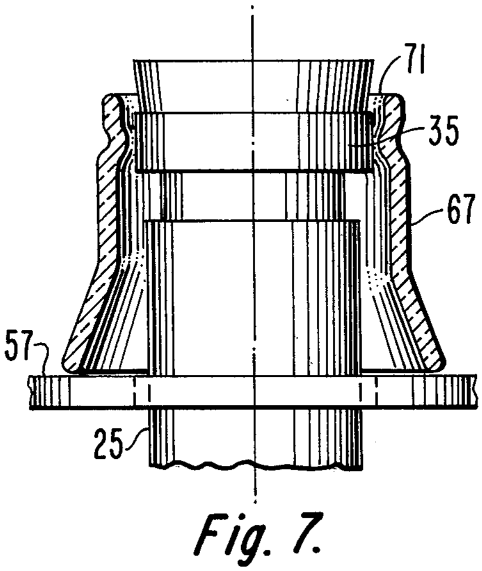

At station No. 12, annealing of the seal begins and continues through station No. 15. At station No. 14, the spindle 25 and mount pin 35 are lowered leaving the stem 61 sealed with the neck 43 but taking the cullet 67 attached to the mount pin 35. The mount pin 35 is lowered to a position such that the bottom of the cullet 67 almost contacts or just contacts the platform 57 as shown in FIGS. 5, 6 and 7. Fires from the nozzles 69 are applied to the upper edge 71 of the cullet 67 with the supporting means 23 continuing to rotate. The fires cause the upper edge 71 to expand and move outward, detaching itself slightly as shown in FIG. 7 and causing the cullet 67 to rest on the support 57.

Figure 8:
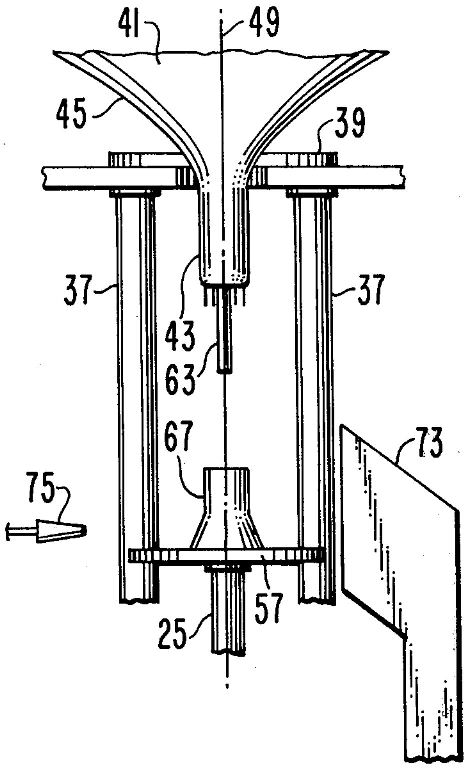
FIG. 8 is a fragmentary elevational view of the supporting means of FIG. 2 advanced to the cullet-removal station No. 15 of FIG. 1.
Figure 9:
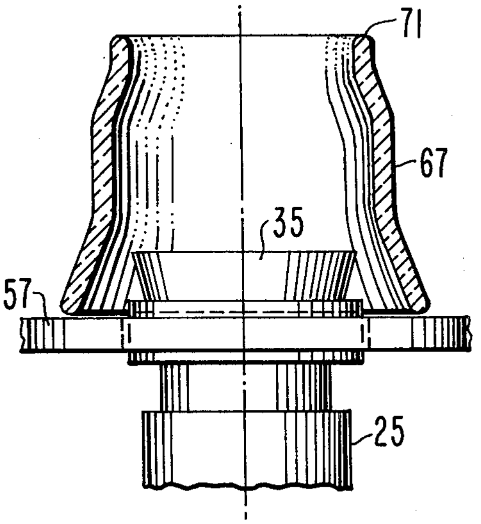
FIGS. 9 and 10 are enlarged fragmentary elevational views of a portion of FIG. 8 before and during the period that the cullet is being removed at station No. 15 of FIG. 1.
Figure 10:
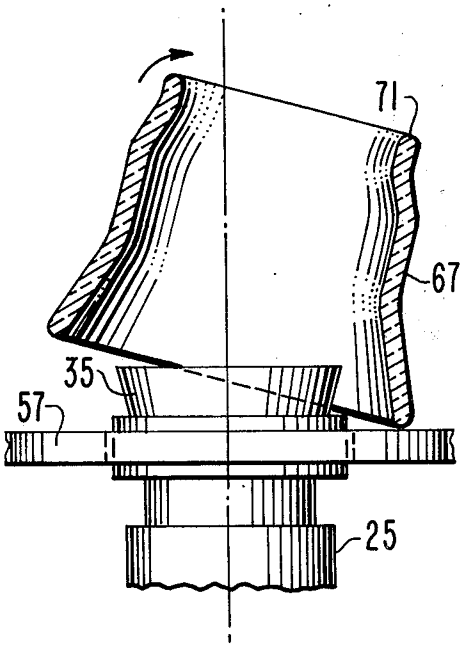

At station No. 15, as shown in FIGS. 8, 9 and 10, the spindle 25 is lowered still further so that the mount pin 35 is within the hole in the support 57. A stationary chute 73 is located adjacent the outer side of the turret 21 with input opening towards the cullet 67. A high-pressure air nozzle 75 is located on the opposite side of the cullet 67 from the chute 73. When the posts 37 are rotated about 90° from what is shown in FIG. 8, an air jet from the nozzle 75 causes the cullet 67 to tip up, as shown in FIG. 10, and roll over into the chute 73 which conducts the cullet 67 to a closed bin 77 (FIG. 1). The air jet continues to blow to cool the mount pin 35. The supporting means 23 then advances to the station No. 16, where the tube with the stem sealed therein is unloaded. An air jet at station No. 16 may blow air to cool the pin 35. Cooling the pin 35 produces less stress in a mount subsequently inserted into the pin 35.

The novel method is a clear departure from the prior practice which is to smash the cullet at the unloading station. In the novel method, the cullet is removed substantially unfractured before the unloading station. In principle, any technique for releasing the cullet from the mount pin may be used, and any technique for removing the cullet from the vicinity of the mount pin may be used, provided, in both cases, the cullet is substantially unfractured. Thus, it is possible to pick up the released cullet with mechanical fingers or with a vacuum system. Also, it may be possible to provide easy release of the cullet by a judicious choice of the jig material. The release and removal of the cullet without substantially fracturing it reduce the change occurrences of accidents to personnel and equipment and of the degradation of product performance due to airborne particles.

We claim:

1. In a method for sealing a glass stem into the glass neck of an electron tube including positioning said glass stem on a mount pin in a desired position in said neck, said neck being longer than desired, heat-sealing said neck to said stem, heat severing the excess glass from said neck, whereby the molten portion of said excess glass attaches itself to said mount pin, and sliding said mount pin away from said stem with said excess glass attached around said mount pin, the additional steps comprising (a) heating said excess glass until it releases from said mount pin without substantially fracturing said excess glass, and then (b) removing said released excess glass from the vicinity of said mount pin without substantially fracturing said glass.

2. The method defined in claim 1 wherein step (a) is achieved by rotating said mount pin and simultaneously applying heat to said excess glass in the region where said glass is attached to said mount pin until said glass softens and expands away from said mount pin.

3. The method defined in claim 1 including prior to step (a), providing a horizontal platform around said mount pin and below said excess glass, and then positioning said attached excess glass just above said platform, whereby said excess glass is supported on said platform upon being released.

4. The method defined in claim 1 wherein step (b) includes providing a chute adjacent said excess glass, and then blowing said excess glass into said chute.

5. The method defined in claim 1 wherein step (b) includes supporting said released glass upon a horizontal platform around said mount pin, positioning a chute adjacent said platform, lowering said mount pin with respect to said platform, and blowing said excess glass off said platform into said chute.

6. The method defined in claim 1 including, subsequent to step (b), cooling said mount pin.

7. In the method defined in claim 1, the steps comprising heating said excess glass until it releases from said mount pin, providing a horizontal platform around said mount pin and below said excess glass, lowering said mount pin with respect to said platform, whereby said released excess glass is supported on said platform, providing a chute adjacent said platform, and blowing said excess glass from said platform into said chute.

* * * * *